No. 883,314. PATENTED MAR. 31, 1908.
W. W. JONES.
AXLE NUT.
APPLICATION FILED MAR. 7, 1907.

Wiley W. Jones,
INVENTOR.

WITNESSES:

By C. A. Snow & Co.
ATTORNEYS

THE NORRIS PETERS CO., WASHINGTON, D. C.

UNITED STATES PATENT OFFICE.

WILEY W. JONES, OF DOWNS, KANSAS.

AXLE-NUT.

No. 883,314.

Specification of Letters Patent.

Patented March 31, 1908.

Application filed March 7, 1907. Serial No. 361,128.

*To all whom it may concern:*

Be it known that I, WILEY W. JONES, a citizen of the United States, residing at Downs, in the county of Osborne and State of Kansas, have invented a new and useful Axle-Nut, of which the following is a specification.

This invention relates to a nut of that type applied to the ends of axles for holding the wheels thereon and, while intended more particularly for use on wooden axles protected by a skein, it is equally applicable to metal axles and other uses.

The principal object of the invention is to provide a nut with a locking device to engage with one of a series of notches or perforations made in the end of an axle skein or axle surrounding the screw threaded projection formed thereon.

A further object of the invention relates to the locking device itself which is designed to automatically engage a notch or perforation when the nut is screwed home, and prevent it from becoming unscrewed by jarring or shaking of the vehicle or the backward rotation of the wheel; and also to permit the locking bolt to be withdrawn and the nut removed when it is desired to take the wheel from the axle.

With this and other objects in view the invention consists of the novel construction, combination and arrangement of parts hereinafter described and definitely claimed.

Figure 1:
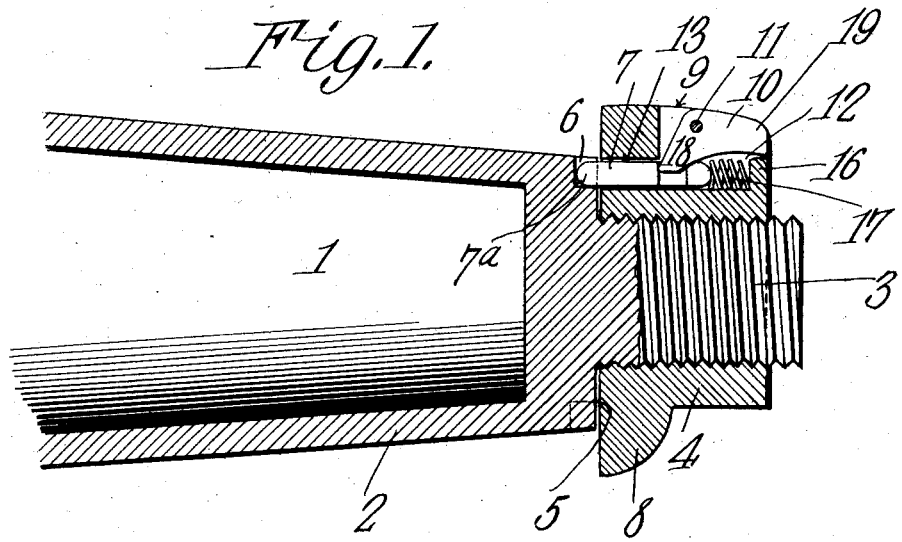
Figures 2, 3:
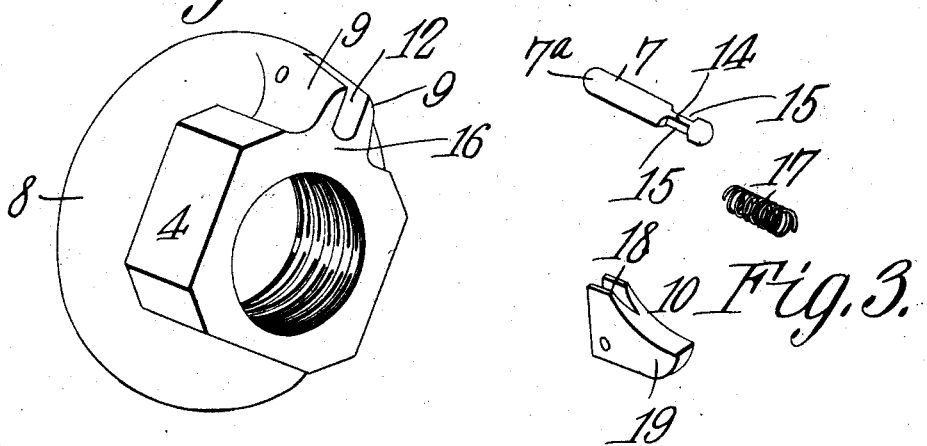

In the accompanying drawings: Figure 1 is a longitudinal section through one end of an axle with the nut in place thereon. Fig. 2 is a perspective view of the nut. Fig. 3 is a view illustrating in perspective the several parts of the locking device detached.

Similar numerals of reference indicate the same parts in all the figures.

The numeral 1 indicates the end of a wooden axle protected from wear by the usual skein 2, from the outer end of which projects a threaded portion 3, on which the nut 4 is screwed for retaining a wheel on the axle. While I have shown, for the sake of illustration, a wooden axle provided with a skein, it is to be distinctly understood that the invention may be used in connection with a metal axle or even a bolt.

The diameter of the threaded portion 3 is, as usual, less than the diameter of the bearing surface of the skein or axle at its end, a flat shoulder 5 is thus provided against which the nut 4 rests when fully screwed up.
In the face of this shoulder 5 a series of notches or perforations 6 of any desired size or number are made with one of which a sliding bolt 7, carried by the nut, engages when in position on the axle.

The nut 4 is of the usual square form with a base flange 8 which bears against the outer end of the wheel hub or an interposed washer if such be used. On one of the square sides of the nut are two outwardly projecting ribs 9, extending from the face of the washer back to the flange, between which ribs is hinged a lever 10, on a pivot 11, passing through it and suitable holes in the ribs. In line with the space 12, between the ribs and at the bottom thereof, a circular hole 13 is bored through the flange 8, through which hole the sliding bolt 7 passes. The sliding or locking bolt 7 is preferably, though not necessarily of cylindrical form, having hemispherical ends and a neck 14 near one end, narrower than the bolt and made by cutting away the substance of the bolt at the points 15—15. The outer end of the space or socket 12 is partly closed by a wall 16 which forms an abutment for a spiral spring 17, bearing at its other end against the necked end of the locking pin 7. The lever 10 is approximately triangular in shape; through one of its angles, the pivot pin 11 passes while another 18 is forked to straddle the neck 14 of the locking pin 7. The third angle of the lever 10 extends outwardly as at 19 and above the wall 16, forming a finger piece by means of which the lever 10 is operated.

In applying the nut to an axle, it is screwed on the threaded portion until the projecting end 7ª of the locking pin strikes the shoulder 5 of the axle. The end 19 of the lever 10 is then raised, drawing back its forked end 18 and with it the locking bolt 7, thus compressing the spring 17 and retracting end 7ª of the locking bolt until it is entirely within the circular hole 13; the parts being held in this position, until the nut has been turned up as far as it will go, or it is desired to carry it. When the lever 19 is disengaged, the spring 17 projects the locking bolt 7, which enters one of the notches 6 in the end of the axle and securely holds the nut against rotation in either direction. The nut may be easily removed by a similar operation of the locking device and a backward rotation of the nut. From the above it will be noted that although the locking device is easily operated to engage or disengage the locking bolt from one of the notches in the axle end, the nut is safely held when the parts are engaged, from rotation in either direction.

Having thus described the invention what is claimed is:—

A nut having an opening formed therethrough parallel with the axis of the nut, a pin slidable in said opening and provided on its inner end with a neck, a lever pivoted to said nut within said opening and having one end forked and straddling the necked portion of said pin and the other end extending outwardly to form a finger piece, and a spring adapted to project said pin beyond the base of the nut.

In testimony that I claim the foregoing as my own, I have hereto affixed my signature in the presence of two witnesses.

WILEY W. JONES.

Witnesses:
J. H. CARNES,
J. H. RATHBUN.